US009990719B2

(12) United States Patent
Esparza Manzano et al.

(10) Patent No.: US 9,990,719 B2
(45) Date of Patent: Jun. 5, 2018

(54) METHOD AND SYSTEM FOR GENERATING MULTIPARAMETRIC NOSOLOGICAL IMAGES

(71) Applicant: UNIVERSIDAD POLITÉCNICA DE VALENCIA, Valencia (ES)

(72) Inventors: Miguel Esparza Manzano, Valencia (ES); Elies Fuster Garcia, Valencia (ES); Juan Miguel Garcia Gomez, Valencia (ES); Javier Juan Albarracin, Valencia (ES); Jose Vicente Manjon Herrera, Valencia (ES); Monserrat Robles Viejo, Valencia (ES); Carlos Saez Silvestre, Valencia (ES)

(73) Assignee: UNIVERSIDAD POLITÉCNICA DE VALENCIA, Valencia (ES)

( * ) Notice: Subject to any disclaimer, the term of this patent is extended or adjusted under 35 U.S.C. 154(b) by 0 days. days.

(21) Appl. No.: 15/508,079

(22) PCT Filed: Jul. 28, 2015

(86) PCT No.: PCT/ES2015/070584
§ 371 (c)(1),
(2) Date: Mar. 1, 2017

(87) PCT Pub. No.: WO2016/034749
PCT Pub. Date: Mar. 10, 2016

(65) Prior Publication Data
US 2017/0287133 A1    Oct. 5, 2017

(30) Foreign Application Priority Data

Sep. 5, 2014  (ES) .................................. 201431289

(51) Int. Cl.
*G06K 9/00*    (2006.01)
*G06T 7/00*    (2017.01)
(Continued)

(52) U.S. Cl.
CPC ............ *G06T 7/0012* (2013.01); *G06T 5/002* (2013.01)

(58) Field of Classification Search
USPC ....... 382/100, 103, 106, 128–134, 154, 162, 382/168, 173, 181, 190, 219, 224, 232,
(Continued)

(56) References Cited

U.S. PATENT DOCUMENTS 5,909,515 A * 6/1999 Makram-Ebeid ........ G06K 9/40
382/132
7,433,520 B1 * 10/2008 David .................... G16H 50/70
382/224

(Continued)

FOREIGN PATENT DOCUMENTS

WO    WO 2008/014340    1/2008
WO    WO 2009/006696    1/2009

OTHER PUBLICATIONS

International Search Report and Written Opinion dated Oct. 26, 2015 for PCT/ES2015/070584, 7 pages.
(Continued)

*Primary Examiner* — Seyed Azarian
(74) *Attorney, Agent, or Firm* — Squire Patton Boggs (US) LLP

(57) ABSTRACT

The method of generating multi-parametric nosological images including the steps of obtaining a stack of images; improving such images; reducing the images to a new space of equivalent representation; classifying in an unsupervised manner the units of the images obtained according to a pre-established number of classes without biological interpretation; automatically assigning multi-parametric profiles to the obtained classes; and generating a nosological image through the obtained classes. The system includes an imaging unit; an image processing unit for processing the obtained images and generating therefrom a multi-paramet-
(Continued)

ric nosological image; a connection for transmitting the images obtained by the imaging unit to the image processing unit; and a display for displaying the generated multi-parametric nosological image.

20 Claims, 1 Drawing Sheet

(51) Int. Cl.
G06T 5/00 (2006.01)
A61B 6/00 (2006.01)

(58) Field of Classification Search
USPC ........ 382/254, 274, 276, 305, 312; 378/4, 5, 378/21; 348/79
See application file for complete search history.

(56) References Cited

U.S. PATENT DOCUMENTS

2004/0264628 A1* 12/2004 Besson ................. A61B 6/032 378/5
2010/0111396 A1* 5/2010 Boucheron .......... G06K 9/0014 382/133
2012/0127297 A1* 5/2012 Baxi ..................... G06T 7/0002 348/79
2013/0094743 A1* 4/2013 Coenegrachts ....... G06T 7/0016 382/131

OTHER PUBLICATIONS

International Search Report dated Jul. 28, 2015 for PCT/ES2015/070584, 7 pages (English translation).
Schad, et al.; "MR tissue characterization of intracranial tumours by means of texture analysis" Magn. Reson. Imaging; vol. 11, pp. 889-896; 1993.
Cai, et al.; "Probabilistic segmentation of brain tumours based on multi-modality Magnetic Resonance Images", MRI. 4th IEEE Intl. Symp. on Biomedical Imaging (ISBI), pp. 600-603; 2007, 4 pages.
Jensen, et al.; "Computer-aided detection of brain tumour invasion using multi-parametric MRI", J. Magn. Reson. Imaging, 30(3) pp. 481-489; Sep. 2009, 23 pages.

* cited by examiner

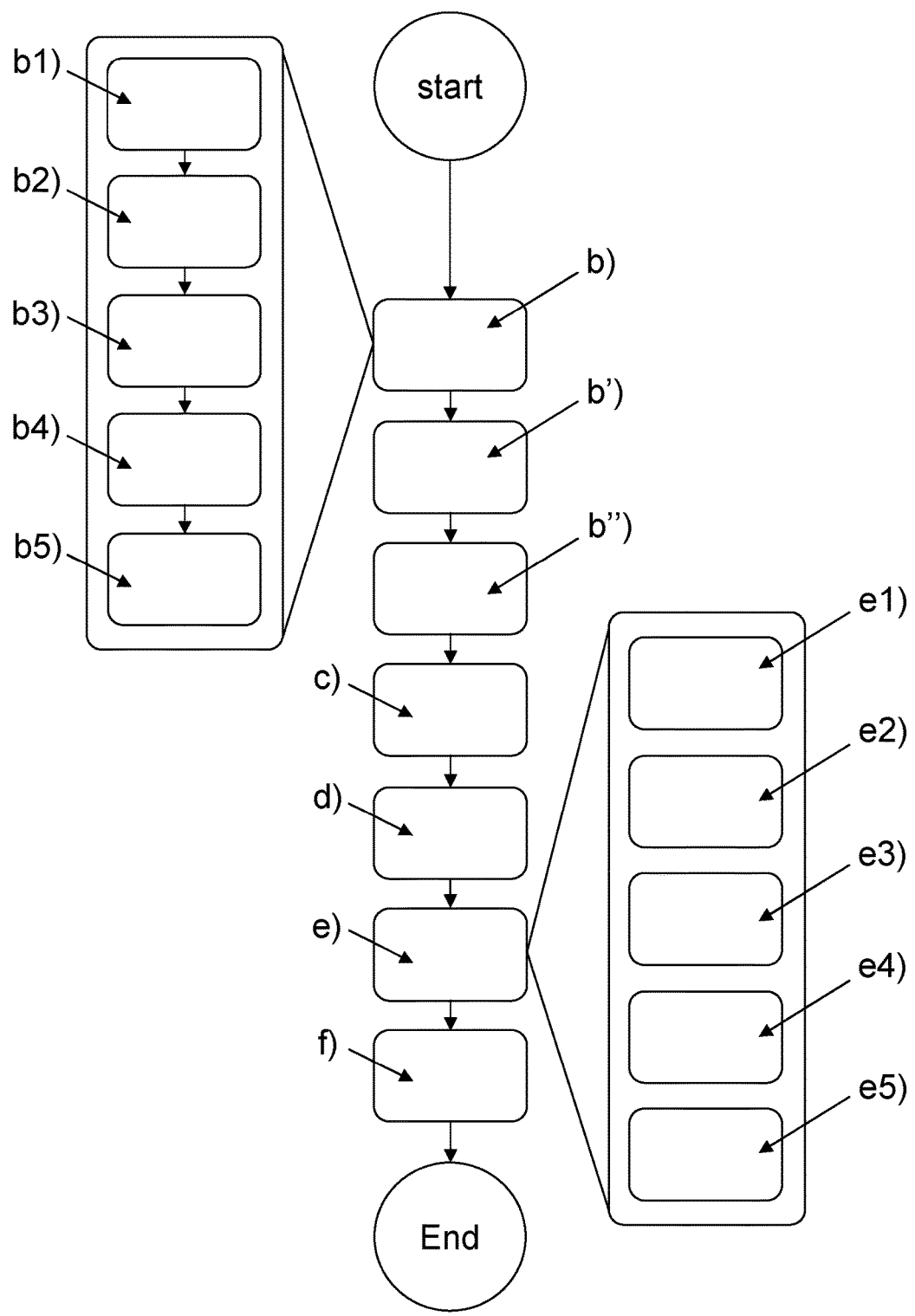

METHOD AND SYSTEM FOR GENERATING MULTIPARAMETRIC NOSOLOGICAL IMAGES

FIELD OF THE INVENTION

The present invention relates generally to the field of medicine, more particularly to a method and system for generating multi-parametric nosological images for facilitating diagnosis and treatment of diseases.

BACKGROUND OF THE INVENTION

Nowadays, medical imaging reporting is one of the fundamental elements for diagnosis, prognosis and follow-up of patients. The role of medical imaging reporting is central to the diagnosis, surgical planning and treatment of patients in oncology, neurology and cardiology, among others. The knowledge of the underlying biological processes is opening a new perspective in managing patients, allowing the application of a more personalized, preventive and predictive medicine depending on the particular circumstance of each patient.

Currently, medical imaging protocols enhance anatomic features that are increasingly specific to tissues. Furthermore, certain protocols allow quantifying image biomarkers related to functional characteristics of tissues. The information obtained individually by each of these types of images may be combined in such a way that it permits describing derived information that is closer to the biological processes of interest for studying the disease.

Clinical areas of medical imaging need tools that provide doctors with tissue segmentations related to the biological processes underlying the diagnosis and/or prognosis of the disease. This capacity would permit reporting the expected progression of the patient and therefore choosing the particular treatment that provides best expected utility to the condition of the patient.

Quantitative medicine is a global trend that seeks to provide accurate information for medical decisions. Current approaches involve the extraction of biomarkers. However, the current biomarkers are based only on a medical image, which restricts the information provided by these biomarkers about the biological processes occurring in the patient's tissues. The definition of biomarkers from multiple complementary medical images may provide more and better information on the biological processes of tissues. Multi-parametric biomarkers are those biomarkers that are extracted from various medical images. There are several technical complications in obtaining multi-parametric biomarkers.

For example, it has been found for certain medical problems that the observation of features close to the biological processes and to the prognosis of the disease based on the usual procedure followed by medical imaging professionals is not possible. This is because the solution results from combining several medical images, and it cannot be observed through a single sequence. Such a difficulty does not permit designing automatic segmentation systems based on cases segmented by experts, since generating the set of cases has the following limitations:

1) it requires the professional to dedicate a long time (especially in 3D volumes), which limits the obtaining of labeled sets of cases,
2) it is not optimal for some difficult medical problems wherein the provision of labels for all tissues is not possible,
3) it is tedious for the professional, which leads to the rejection or laxity of the task,
4) it is poorly reproducible due to irregular and/or diffuse boundaries, and
5) it achieves results that are similar to those already achieved by the experts, so it does not add any value that permits to improve the radiological reporting.

Therefore, it is desirable to have tools that allow automatic and unsupervised obtaining of multi-parametric images that facilitate the diagnosis and treatment of the patients.

Some systems are already known in the art which allow obtaining images of this type. For example, Schad L et al. (MR tissue characterization of intracranial tumours by means of texture analysis. Magn. Reson. Imaging; 11 889-96; 1993) proposed for first time unsupervised models by clustering. The breakthrough in the development of ML (machine learning) techniques has resulted in more powerful classification algorithms that have rapidly been applied to medical imaging. Cai H et al. (Probabilistic segmentation of brain tumours based on multi-modality MRI. 4th IEEE Int. Symp. on Biomedical Imaging 600-3; 2007), among others, applied support vector machines (SVM) on sets of multi-parametric MRI images to obtain segmentation maps of healthy tissues and sub-compartments within the tumor area. Jensen T and Schmainda K. (Computer-aided detection of brain tumour invasion using multi-parametric MRI, J. Magn. Reson. Imaging, 30 481-9; 2009) explored different approaches based on neural networks also with a multi-parametric combination of anatomical and functional MRI images.

However, all these (and other) currently employed approaches assume that data is independent and identically distributed (i.i.d.). This strong assumption implies considering independence between voxels of the image, which leads to simple models but generally resulting in spatially non-consistent segmentation images, since they do not use the structural information provided by the images.

US20130094743 A1 relates to a method for evaluating tumour lesions by comparing images acquired at different times. The method may be used in different types of images and modalities and performs the registration, radial segmentation and quantification of areas or volumes along with visual presentation of results.

WO2008014340 A3 discloses a method of obtaining diffusion MRI images to create non-symmetric margins for radiotherapy.

However, these and other similar methods known in the prior art, for example, fail to perform a multi-parametric analysis or a segmentation that allows studying parts of the tissues related to biological characteristics, diagnosis, response to treatment and prognosis. They do not permit either obtaining a single multi-parametric nosological image from a stack of multiple medical images.

Therefore, there is a need in the art for a method and system of generating multi-parametric nosological images, from a stack of medical images, allowing easy identification of tissue subtypes related to biology, diagnosis, prognosis and/or response to treatment.

SUMMARY OF THE INVENTION

In order to solve the problems of the prior art, the present invention discloses a method and a system for generating multi-parametric nosological images.

Thus, in a first aspect, the present invention relates to a method of generating multi-parametric nosological images, comprising the steps of:

a) obtaining a stack of medical images;
b) improving said stack of medical images, through the steps of:
  b1) subjecting each image of the stack to a noise filtering;
  b2) registering all the images in the stack to a reference space;
  b3) eliminating from the images the areas corresponding to peripheral tissues of the region of interest;
  b4) correcting inhomogeneities of the images; and
  b5) optionally, improving the resolution of the images;
c) reducing the stack of images to a new representation space of smaller dimension, which maintains or increases the discriminative properties of the original data;
d) classifying in an unsupervised manner the units of the stack of images obtained in step c) according to a pre-established number of classes without biological interpretation;
e) automatically assigning multi-parametric profiles to the classes obtained in step d), through the steps of:
  e1) registering in a non-linear manner a reference template of the region of interest to the stack of images;
  e2) correcting the probability maps of healthy tissues of the reference template in the pathological areas;
  e3) identifying which classes obtained in step d) represent the non-pathological tissues by using the probability maps of healthy tissues corrected in step e2);
  e4) eliminating peripheral and minimal classes from the set of classes obtained in step d); and
  e5) merging in the pathological areas the rest of classes from step d) through agglomerative hierarchical classification using distances between their probability density functions; and
f) generating a nosological image through the classes obtained in steps e3) and e5).

The method of the present invention solves the suggested technical problem, i.e. allows obtaining a multi-parametric nosological image in automatic and unsupervised manner from a stack of medical images, and thus provides several advantages over the methods of the prior art:

personalized follow-up of patients with complex clinical processes is permitted;
reporting through medical images of the patients is improved;
performing sub-segmentation of tissues with respect to biological processes, diagnosis, response to treatment and/or prognosis of the patient is permitted;
detection of new regions of interest in case studies is permitted;
times to inform in each case are improved;
effectiveness of medical imaging devices for acquiring stacks of medical images is increased;
cost per case study is maintained or even reduced.

According to a second aspect of the present invention, it is disclosed a multi-parametric nosological imaging system comprising:

an imaging unit for obtaining a stack of images of a patient;
an image processing unit for processing the stack of images obtained by the imaging unit and generating therefrom a multi-parametric nosological image, by performing the steps of the method according to the first aspect of the present invention;
connecting means between the imaging unit and the image processing unit, which permit transmitting the images obtained by the imaging unit to the image processing unit; and
display means for displaying to the user the multi-parametric nosological image generated by the image processing unit.

BRIEF DESCRIPTION OF THE FIGURES

The present invention will be better understood with reference to the following drawing which illustrates a preferred embodiment of the invention, provided by way of example, and which is not to be construed as limiting the invention in any way.

FIG. 1 is a diagram schematically showing the steps of the method according to a preferred embodiment of the present invention.

DETAILED DESCRIPTION OF THE PREFERRED EMBODIMENTS

As used herein, it is intended that the term "unit" in the expressions "image unit", "stack of images unit", and the like includes both pixels (in the case of 2D images) and voxels (in the case of 3D images).

A detailed description of a preferred embodiment of a method according to the present invention is provided bellow. According to this preferred embodiment of the invention, the method of generating multi-parametric nosological images is applied to a case of high-grade glial tumours. In this case, medical images are anatomical and perfusion images obtained through magnetic resonance imaging (MRI), even though it should be understood that in other cases it may be useful to apply the method of the present invention to the processing of medical images obtained through other different techniques.

Segmentation of the tumour and peritumoral area as well as the classification of the different subtypes of abnormal tissues, such as oedema or necrosis, is crucial for following-up the evolution of the tumour during therapy. The standard imaging technique for the diagnosis of brain tumour is magnetic resonance imaging (MRI). MRI provides detailed images of the different types of tissues in the brain in a non-invasive way. MRI sequences for the diagnosis and follow-up of brain tumours include T1-weighted images, T2-weighted images, T2-weighted images with fluid attenuation (FLAIR), and T1-weighted images with contrast, as well as a T2-weighted perfusion series.

This information may allow anatomical-functional characterization of the different biological signatures of the different areas of the volume of interest related to the tumour, thereby providing a better radiological assessment of the patient's situation.

The method of the present invention allows analyzing the stack of anatomical-functional images of a patient to achieve sub-segmentation of a volume of interest in different types of tissue related to diagnosis, prognosis and/or response to treatment, such as e.g. tumour tissue of greater aggressiveness, tumour of less aggressiveness, normal parenchyma, vessels, oedema, necrosis and cerebrospinal fluid.

In this case, the acquisition of the images implies a bias that can vary the contrasts of the tissues. In addition, the images usually present noise artifacts produced by the acquisition of the images themselves and may present magnetic field inhomogeneities produced by the MRI machine. In addition, it is necessary for the multi-parametric analysis that all the images are in a common resolution space and that a reference space is defined to which the images are registered. As a consequence of stacking images and feature extraction, the space may be large, so for a correct unsupervised classification (that is, assignment of labels to a set of cases without having previously obtained a model through a set of similar cases labeled manually by experts) it is necessary to reduce the dimensionality. Finally, a final step is needed to eliminate the classes corresponding to artifacts and to unify similar classes.

In the accompanying FIG. 1, the steps of the method according to the preferred embodiment of the present invention are schematically shown, in the specific case of the processing of MRI images of a patient with glial tumour. This method allows obtaining nosological images that are compatible with the expert knowledge summarizing the presence of sub-regions of tissues and lesions in a single coded image, for example through colors, according to biological processes, diagnosis and/or prognosis of the patients. For that aim, the medical cases are analyzed from stacks of images acquired or quantified with different resolutions without using models based on previous segmentations.

Briefly, given a stack of images of a same patient, the method of the preferred embodiment obtains a nosological image related to the underlying biological processes, diagnosis and/or prognosis of the disease.

Thus, the first step a) of the method, not shown in FIG. 1, is obtaining a stack of medical images (in this case MRI images) from a given patient.

The second step b) of the method is improving the obtained stack of medical images. As shown in FIG. 1, this step is further divided into a series of sub-steps, namely:

b1) Noise Filtering

To eliminate noise and improve the quality of the obtained images, each image of the stack is subjected to noise filtering. For example, the adaptive version of the NLM (Non-Local Means) filter for anatomical images may be used for that end. In the case of functional images, such as perfusion images, the local PCA method may be used to take advantage of temporal as well as spatial information during filtering.

b2) Registering to the Reference Space

At this step all the images in the stack are registered to a common reference space. In the case of a neurological image, the MNI space (Montreal Neurological Institute space) may be used through interpolation. Therefore, an affine registering without deformation of all images to the common space MNI152 is performed using the SyN algorithm implemented in the ANTS (Advanced Normalization Tools) suite to preserve the morphology of the tumour and the affected regions. According to further embodiments other registering methods may be applied, such as for example registering through non-linear transformations (i.e., diffeomorphic registering).

In the case of functional sequences (such as e.g. in the case of perfusion), all the dynamics may be registered to a reference image or a step-by-step registering may be performed. The first step consists of registering the first dynamic of the sequence to a reference anatomical image. The second step consists of registering the rest of the dynamics of the sequence to the first dynamic, and the subsequent application of the transformation matrix obtained from the registering of the first dynamic to the anatomical image of reference, calculated in step 1.

b3) Removal of Skull and Extra-Meningeal Tissues

At this step, the areas corresponding to the skull, extra-meningeal tissues and non-cerebral tissues of the region of interest are removed from the images. In the case of a neurological image, for example, the ROBEX method (Iglesias J E, Liu C Y, Thompson P, Tu Z: "Robust Brain Extraction Across Datasets and Comparison with Publicly Available Methods", IEEE Transactions on Medical Imaging, 30 (9), 2011, 1617-1634) may be employed.

b4) Correction of Magnetic Field Inhomogeneities

At this step, the magnetic field inhomogeneities of the images are corrected. For this purpose, for example, the N4 method (Tustison N J, Avants B B, Cook P A, et al. N4ITK: improved N3 bias correction. *IEEE Trans Med Imaging.* 2010; 29(6):1310-1320. doi:10.1109/TMI.2010.2046908) may be used, which is an evolution of the popular N3 method known in the art and which has been shown to be robust for the correction of this type of artifacts under different conditions. Because N4 is oriented to healthy tissues and to single-volume corrections, the N4 method should be controlled in the method according to the present invention. Indeed, for the correction of field inhomogeneities in images containing pathological abnormalities (for example, brain tumours) it is necessary to avoid confusing the pathological information with the inhomogeneities of the magnetic field and thus eliminating this information erroneously. To solve this possible error, an adjustment of the number of iterations is performed and a low convergence threshold of the N4 method is fixed.

b5) Super-Resolution (Optional)

At this step, the spatial resolution of the stack of images used in the study is optionally improved (increased). Different techniques for increasing the resolution of the stack of images may be applied. According to the preferred embodiment, a super-resolution technique for RMI images based on the "Non-Local Means" algorithm (Buades A., Coll B., Morel J.-M. A non-local algorithm for image denoising. Computer Vision and Pattern Recognition, 2005. CVPR 2005. IEEE Computer Society Conference. doi: 10.1109/CVPR.2005.38) is used for noise filtering. In particular, two techniques are proposed to improve the resolution of the images: Super-resolution from a high resolution complementary image of the same patient (José V. Manjón, Pierrick Coupé, Antonio Buades, D. Louis Collins and Montserrat Robles. MRI Super-resolution Using Self-Similarity and Image Priors. International Journal of Biomedical Imaging, 2010. doi: 10.1155/2010/425891) or super-resolution based on correlation of patterns of the low resolution image itself (José V. Manjón, Pierrick Coupé, Antonio Buades, V Fonov, D. Louis Collins and Montserrat Robles. Non-local MRI upsampling. Med Image Anal, 2010. doi: 10.1016/j.media.2010.05.010). This allows taking advantage of the similarity that is present in the images through reconstruction based on patches of nonlocal patterns.

In the next step of the method (step b')), the intensity of the images of the stack is normalized, so that the same intensity traits are obtained between different studies.

Performance of this step b') is preferable according to the preferred embodiment of the present invention, but it is not mandatory and therefore embodiments of the method of the present invention may be conceived without such step b'). This step allows extracting profiles more adjusted and comparable between patients. It may be performed, for example, through matching of histograms.

Then, in step b"), features extraction from the stack of images is performed. As in the previous case, this step b") is also not required for the correct application of the method of the invention, and therefore the skilled person in the art will be able to conceive further embodiments of the present invention without this step b").

Step b") therefore consists of applying various features extraction methods in order to increase the information used by the method for performing the segmentation. Each of the extracted features then constitutes a new image that is added to the stack of images. Features extraction may be performed through various methods, such as for example:
- quantification of image biomarkers from functional images,
- features extraction through operations on the anatomical images or image biomarkers
- extraction of first-order texture features from anatomical images or image biomarkers. Specifically, it is possible to calculate the mean ($\mu$), variance ($\sigma$), asymmetry ($\gamma$) and kurtosis (K) of small sub-regions centered on each of the voxels of the images.

A combination of two or more of any of the above methods may also be applied.

In the next step c) reduction of the space is performed. In this case, dimensionality reduction methods (such as e.g. PCA (Principal Component Analysis)) are used to reduce the stack of images to a new space of equivalent images retaining at least 90% of the original variance, and accumulating the variability of the information in a reduced number of components.

Next, in step d), unsupervised classification of the voxels of the images obtained in the previous step is performed. To this end, according to the preferred embodiment of the present invention, it is assumed a structured model of Gaussian distributions mixtures representing the classes of the tissues. Therefore, the assignment of a class to each voxel depends on the assignment of the classes of its immediate neighbors (Ising model). In order to avoid dependency on the knowledge of an expert that provides a manually labeled set on which the learning is to be performed, an unsupervised learning is performed through the expectation-maximization algorithm (hard EM). The information used by this method is the result of step c) and the spatial location (x, y, z) of each voxel.

According to other alternative embodiments of the present invention, independence between voxels is assumed and unsupervised methods, such as K-means, Fuzzy K-Means and EM, are applied over mixtures of Gaussian distributions.

The method then proceeds to step e) which consists in automatically assigning multi-parametric profiles to the classes obtained in previous step d). As shown in FIG. 1, this step e) is divided, in turn, into several sub-steps:

e1) Non-linear registering of the reference template of the healthy brain to the stack of images.

To perform automatic assignment of multi-parametric profiles, first the areas of the image with healthy tissues are searched for. To this aim, probability maps of healthy tissues are used. Since images of pathological tissues are often deformed, it is previously performed a non-linear registering of a template to a patient reference image (e.g. non-linear registering of the MNI template to an anatomical image of the case under study, i.e. deformation of an average brain of reference to the specific form of the case under study). With the obtained transformation matrix, the probability maps of healthy tissues are deformed, so that it can be known the probability that each voxel of the image under study belongs to a non-pathological tissue.

For example, in the case of brain tumours, it is employed the non-linear symmetric ICBM 2009c template with an isotropic resolution of 1 mm$^3$, from the McConnell Brain Imaging Centre. For this purpose, the image T1 of reference of the template is first registered to the image T1 in the resolution of the nosological image. With the transformation matrix obtained through the registration, it is performed the transformation of the probability maps of white matter, grey matter and cerebrospinal fluid.

e2) Correction of Probability Maps of Healthy Tissues in Pathological Regions

In previous step e1) it is obtained the probability of each type of normal tissue for each voxel. However, since the method of the present invention is applicable to cases of pathological studies, a low probability of belonging to normal tissues should be assigned to the pathological regions. To do this, a mask is generated including the voxels whose intensity in several anatomical images of reference exceeds a threshold. Subsequently the gaps that appear in the planes of the mask are filled up and the voxels located in the perimeter of the volume are eliminated. The probability maps of step e1) are corrected by setting to 0 those voxels included in the mask.

e3) Identification of Classes of the Segmentation with Non-Pathological Tissues

Thanks to the probability maps corrected in step e2), an indicator is calculated that is equivalent to the probability mass of each class obtained in step d) of belonging to a non-pathological class. In this manner, the classes of step d) with greater mass of belonging to non-pathological classes are assigned to healthy tissue until completion of 80% of the total probability mass of the non-pathological classes.

e4) Elimination of Peripheral and Minimal Classes

Some classes of step d) are produced by border artifacts. Therefore, in this step of the method of the preferred embodiment of the present invention, a mask covering the peripheral area of the region studied in the images is calculated and those classes with more than 50% of their voxels activated in said region are eliminated. Subsequently, classes with less than 1% of the voxels of the study are eliminated, since they are considered to be minimal classes.

e5) Merging of statistically similar classes.

Jensen-Shannon distance is obtained between the probability density functions of the rest of classes obtained in step d). In order to estimate the probability density functions, an estimate is used through Gaussian kernels. An agglomerative hierarchical classification is performed with the distances between distributions and average link (UPGMA) for merging the classes. Classes are merged until a number predefined by the user is achieved.

Finally, step f) consists of generating the nosological image through the classes obtained in steps e3) and e5). The final multi-parametric nosological image is generated as a false color mask, for example in NIfTI and DICOM formats, wherein each color represents a multi-parametric profile.

The skilled person in the art will appreciate that the method according to the preferred embodiment of the present invention described hereinbefore provides several advantages over other similar methods known in the prior art. For example, thanks to the method of the present invention it is possible to work with initial medical images of any type, including perfusion images that provide very relevant vascular information, for example, for the segmentation of tumours. Thus, the method of the invention allows obtaining a multi-parametric nosological image in automatic and unsupervised manner, from images obtained conventionally. Therefore, the method of the invention allows a better treatment and diagnosis of the patient with respect to the use of a single conventional image (e.g. an MRI image), and allows considerable time savings over the generation of multi-parametric images obtained in a supervised manner by a professional.

As will be understood by one skilled in the art, the method of the present invention may be applied to both 2D and 3D images, and allows obtaining as result 2D and 3D multi-parametric nosological images, respectively.

As mentioned above, the present invention relates, in a second aspect, to a multi-parametric nosological imaging system. According to the preferred embodiment of this second aspect of the present invention, the system comprises:

an imaging unit for obtaining a stack of images of a patient;
an image processing unit;
connecting means between the imaging unit and the image processing unit, which permit transmitting the images obtained by the imaging unit to the image processing unit; and
display means for displaying to the user the multi-parametric nosological image generated by the image processing unit.

According to the preferred embodiment of the system of the present invention, the imaging unit for obtaining the stack of images is a conventional magnetic resonance imaging unit.

The image processing unit receives, via the connection means, the stack of images obtained by the imaging unit. Then, the image processing unit processes said stack of images by applying steps b) to e) of the method according to the first aspect of the invention, which has been described in detail hereinbefore, and generates, according to step f) of the method of the first aspect of the present invention, a multi-parametric nosological image from said stack of obtained images.

The obtained multi-parametric nosological image is visually presented to the user (the doctor in charge) through appropriate displaying means (for example, on a computer screen).

Even though the present invention has been described with reference to specific embodiments thereof, it will be understood by one skilled in the art that modifications and variations may be applied to such embodiments without thereby departing from the scope of the present invention, defined solely by the appended claims.

The invention claimed is:

1. A method of generating multi-parametric nosological images, comprising using one or more processors to perform the steps of:
   a) obtaining a stack of medical images;
   b) processing the stack of medical images, through the steps of:
   b1) subjecting each image to a noise filtering;
   b2) registering each image to a reference space;
   b3) eliminating from at least some of the images areas corresponding to peripheral tissues of a region of interest;
   b4) correcting inhomogeneities in at least some of the images;
   c) reducing the stack of images to a new representation space of smaller dimension, which maintains or increases discriminative properties of original data in the stack of images;
   d) classifying in an unsupervised manner units of the stack of images obtained in step c) according to a pre-established number of classes and without biological interpretation of the units of the stack of images obtained in step c);
   e) automatically assigning multi-parametric profiles to the classes obtained in step d), through the steps of:
   e1) registering in a non-linear manner a reference template of a region of interest to the stack of images;
   e2) correcting probability maps of healthy tissues of the reference template in pathological areas;
   e3) identifying which classes obtained in step d) represent non-pathological tissues by using the probability maps of healthy tissues corrected in step e2);
   e4) eliminating peripheral and minimal classes from the set of classes obtained in step d) to produce a remaining set of classes; and
   e5) merging in the pathological areas the remaining set of classes from step d) through agglomerative hierarchical classification using distances between probability density functions; and
   f) generating a nosological image through the classes obtained in steps e3) and e5).

2. The method according to claim 1, wherein after step b4 the method further comprises:
   b5) improving a resolution in the stack of images through a super-resolution step.

3. The method according to claim 2, wherein after step b5 the method further comprises:
   b') normalizing an intensity of the images in the stack for obtaining the same intensity ranges between different studies.

4. The method according to claim 3, wherein after step b') the method further comprises:
   b") extracting features from the stack of images, each feature being a new image added to the stack of images.

5. The method according to claim 4, wherein step b") comprises any one of quantifying image biomarkers from functional images, extracting features through operations on the functional images, extracting first-order or second-order texture features from the functional images, or any combination thereof.

6. The method according to claim 5, wherein the images are selected from the group constituted by 2D and 3D images, so that 2D and 3D multi-parametric nosological images are obtained as result, respectively.

7. The method according to claim 5, wherein a structured classification is performed in step d).

8. The method according to claim 4, wherein the images are selected from the group constituted by 2D and 3D images, so that 2D and 3D multi-parametric nosological images are obtained as result, respectively.

9. The method according to claim 8, wherein a structured classification is performed in step d).

10. The method according to claim 4, wherein a structured classification is performed in step d).

11. The method according to claim 3, wherein the images are selected from the group constituted by 2D and 3D images, so that 2D and 3D multi-parametric nosological images are obtained as result, respectively.

12. The method according to claim 11, wherein a structured classification is performed in step d).

13. The method according to claim 3, wherein a structured classification is performed in step d).

14. The method according to claim 2, wherein the images are selected from the group constituted by 2D and 3D images, so that 2D and 3D multi-parametric nosological images are obtained as result, respectively.

15. The method according to claim 14, wherein a structured classification is performed in step d).

16. The method according to claim 2, wherein a structured classification is performed in step d).

17. The method according to claim 1, wherein the stack of images are selected from the group constituted by 2D and 3D images, so that 2D and 3D multi-parametric nosological images are obtained as result, respectively.

18. The method according to claim 17, wherein a structured classification is performed in step d).

19. The method according to claim 1, wherein a structured classification is performed in step d).

20. A multi-parametric nosological imaging system, comprising:
- an image device for obtaining a stack of images of a patient;
- an image processor for processing the stack of images obtained by the image device and generating therefrom a multi-parametric nosological image, by performing the steps of the method according to claim 1;
- a connection between the image device and the image processor, which permits transmitting the images obtained by the image device to the image processor; and
- a display for displaying to the user the multi-parametric nosological image generated by the image processor.

* * * * *